United States Patent [19]

Grant

[11] 4,154,865

[45] * May 15, 1979

[54] METHOD FOR PROCESSING HOPS FOR BREWING

[75] Inventor: Herbert L. Grant, Yakima, Wash.

[73] Assignee: S. S. Steiner, Inc., New York, N.Y.

[*] Notice: The portion of the term of this patent subsequent to Oct. 31, 1995, has been disclaimed.

[21] Appl. No.: 831,479

[22] Filed: Sep. 8, 1977

Related U.S. Application Data

[63] Continuation-in-part of Ser. No. 764,600, Feb. 1, 1977, Pat. No. 4,123,561.

[51] Int. Cl.² .................. C12C 9/02; C07C 45/00; C07C 49/00
[52] U.S. Cl. ..................... 426/600; 260/586 D; 426/655
[58] Field of Search ............. 426/600, 651, 419, 444, 426/271, 655; 260/586 D

[56] References Cited

U.S. PATENT DOCUMENTS

| | | | |
|---|---|---|---|
| 2,833,652 | 5/1958 | Nantz | 426/444 |
| 3,044,879 | 7/1962 | Koch et al. | 426/600 |
| 3,079,262 | 2/1963 | Hougen | 426/600 |
| 3,275,447 | 9/1966 | Mueller | 426/419 |
| 3,765,903 | 10/1973 | Clarke et al. | 426/600 |
| 3,787,586 | 1/1974 | Hokanson et al. | 426/600 |
| 3,952,061 | 4/1976 | Koller et al. | 260/586 D |

FOREIGN PATENT DOCUMENTS

| | | | |
|---|---|---|---|
| 959073 | 12/1974 | Canada | 426/600 |
| 1423129 | 1/1976 | United Kingdom | 426/600 |
| 1424785 | 2/1976 | United Kingdom | 426/600 |
| 1424786 | 2/1976 | United Kingdom | 426/600 |

*Primary Examiner*—Thomas G. Wiseman
*Attorney, Agent, or Firm*—Morgan, Finnegan, Pine, Foley & Lee

[57] ABSTRACT

There is provided a method of processing hops or hop extracts for brewing in which hops and particularly the alpha acids in the hops are stabilized against deterioration and light sensitivity, the process broadly comprising isomerizing a substantial portion of the alpha acids in the hops and contacting said iso-alpha acids with a metallic hydride compound, the metal thereof being suitable for use in foods, until the reaction is substantially completed. In another aspect, the alpha acids present in the hops are converted to their reduced isomerized products which are desirable for brewing. The process is especially suitable for use in pelletizing operations.

43 Claims, 1 Drawing Figure

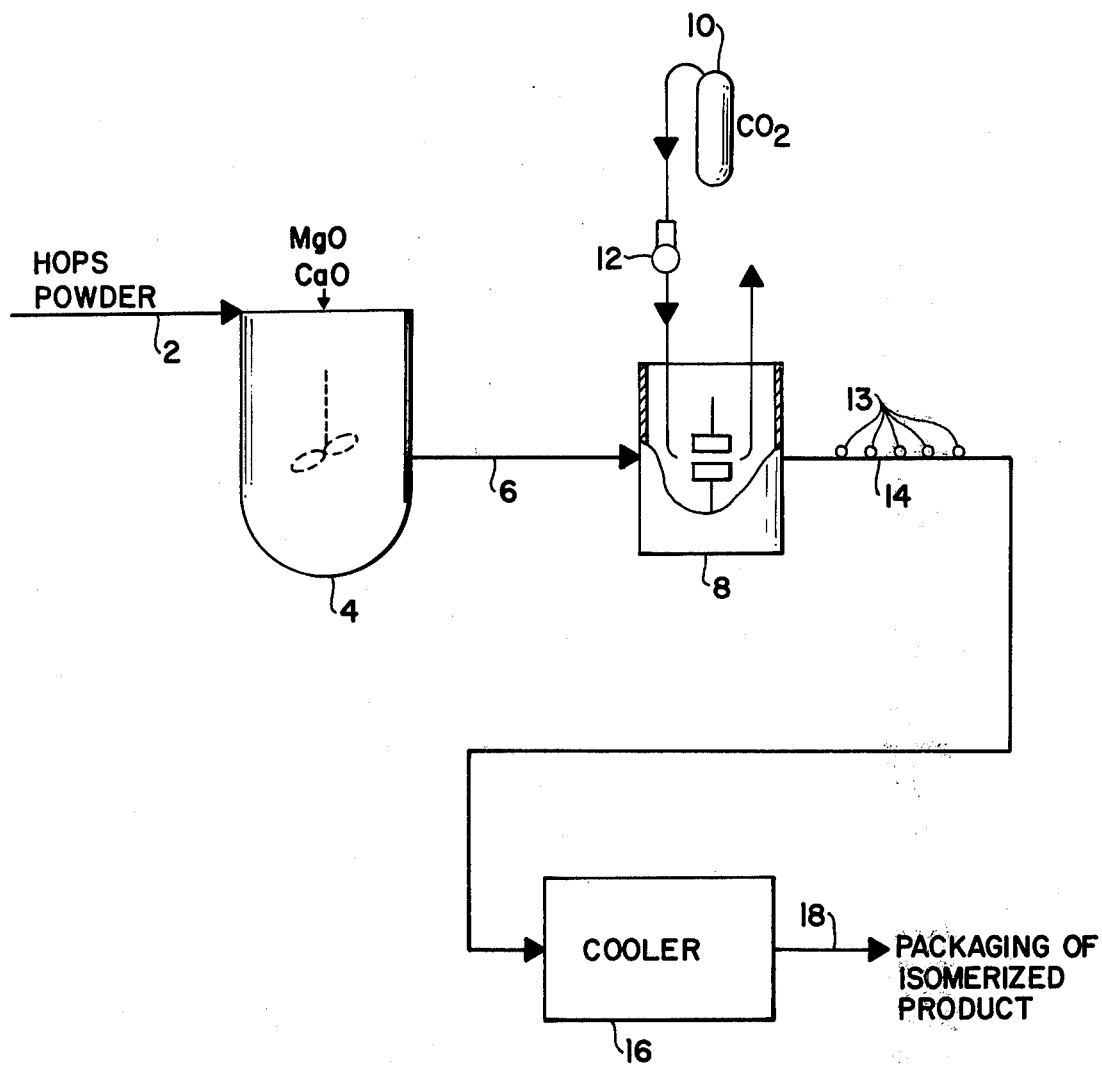

METHOD FOR PROCESSING HOPS FOR BREWING

BACKGROUND OF THE INVENTION

This is a continuation-in-part of application Ser. No. 764,600 filed Feb. 1, 1977, now U.S. Pat. No. 4,123,561.

The present invention relates to a method for stabilizing the alpha acid or humulone content in hops prior to, during, and subsequent to the processing of hops for use in brewing. This invention also pertains to the isomerization of hops and chemical reduction of isomerized hops or hop extracts with good efficiency to obtain high yields of isomerized alpha acids and reduced isomerized alpha acids which are useful as constituents in brewing.

The lupulin or humulin is the glandular trichomes of the strobiles of hops which are used for making various beverages. The lupulin contains two important constituents which are commonly used in brewing beer. These constituents are humulones, also referred to as alpha acids, and lupulones, sometimes referred to as beta acids. The humulones are the primary bitter constituent of the hops which are utilized in brewing beer.

Humulones or alpha acids tend to undergo isomerization forming isohumulones or iso-alpha acids. These isomerization products are desirable constituents in brewing and thus, isomerization is a preferred process reaction. Isomerization typically is carried out intentionally in the brewing kettle.

Humulones are also subject to certain undesirable phenomena, however. Humulones tend to undergo deterioration and break down with undesirable by-products. For instance, under ambient conditions humulones or alpha acids have a tendency to oxidize and polymerize into hard resin. Moreover, during isomerization by-products may form, e.g., humulinic acids, which waste the humulone or alpha acid content of the hops. Another problem is the interreaction of humulones with other constituents in hops or hop extracts, such as lupulones or beta acids, under the stringent operating conditions of prior art processing methods.

The most simple method for preparing hops for use in brewing consists of introducing baled hops directly into the brewing kettle and brewing the mixture of malt, hops and water at the boiling temperature and at acidic, or lower, values of pH. During this procedure, the alpha acids present will isomerize. As a result of the aforementioned undesirable phenomena, however, this technique which is one of the oldest in the brewing business results in only a poor conversion of alpha acids to iso-alpha acids, i.e., in the order of only 25–35% isomerization of the alpha acids.

To prevent or at least ameliorate the deterioration of humulones or alpha acids and undesirable side reactions, most hops processing methods include steps which relate to (1) stabilizing the hops or hop extracts against the deterioration of alpha acids and (2) converting the alpha acids to isomerized alpha acids while minimizing the occurrence of side reactions and by-product formation. These methods have as objects increasing the amount or concentration of alpha acids available for isomerization and increasing the yield of isomerized alpha acids.

For instance, to protect the hops from deterioration, they are sometimes stored at reduced temperatures and/or under vacuum or in an inert atmosphere, e.g., nitrogen. This is an expensive procedure, however.

It has also been proposed to concentrate the alpha acids by separating them from the rest of the hops constituents and charging the concentrated alpha acids to the brewing kettle, e.g., Naatz, U.S. Pat. No. 2,833,652; Muller, U.S. Pat. No. 3,275,447; and Kokanson et al, U.S. Pat. No. 3,787,586, incorporated herein by reference. As a result of using a concentrated feed, the yield of isomerized alpha acids is higher. The process remains inefficient, however.

Still other techniques involve chemically treating separated alpha acids to convert them to iso-alpha acids prior to their addition to the brewing kettle. Such techniques are described in Clarke et al, U.S. Pat. No. 3,765,903 and Koller et al, U.S. Pat. No. 3,952,061. In general, these processes relate to the use of complicated procedures wherein the hops are first extracted with organic solvents and the solubilized hop extract containing alpha acids is then treated with alkali to convert the alpha acids present to their isomerized form. Using this technique, conversions of 80–85% of the recovered alpha acids to iso-alpha acids have been reported.

A shortcoming of these procedures, however, is the difficulty encountered with recovering both the non-isomerized and isomerized alpha acids from the organic solvent. Thus, while the alpha acids may undergo an 80–85% conversion to the isomerized products, as much as 30% or more of the alpha acids, based on the amounts originally present, can remain unrecovered and lost. Moreover, the use of solvent extraction is an expensive procedure.

Other methods have also been proposed, such as the well-known technique of treating the lupulin glands with methylene chloride, after grinding, which tends to separate and concentrate the alpha acids from the rest of the hops so as to yield more of the desired starting material for subsequent use in brewing.

The conversion of alpha acids to isomerized alpha acids does not solve all of the instability problems associated with storing, processing and packaging of hops and hop products. Even when the alpha acids of hops have been isomerized, the hops and hop products exhibit an instability or sensitivity to light. Malt beverages containing hops and hop extracts have long been known to be light sensitive or "light-struck" whereby upon exposure to light, malt beverages tend to degrade yielding a characteristic light-struck odor and taste. Various explanations have been suggested for the cause of these light-struck characteristics. For example, in U.S. Pat. No. 3,044,879 granted to Koch et al, this light-struck phenomenon is attributed to a photochemical reaction involving the isomerized alpha acids. The patent suggests that a photochemical reaction occurs whereby there is a cleavage of the side chains from the ring structure of the iso-alpha acids forming free radicals which in turn tend to react with sulfhydryl groups to form odoriferous compounds.

Many suggestions have been made to overcome the light sensitivity of malt beverages. For example, beer and ale have been specially packaged in colored bottles or opaque packages to exclude light. In the aforementioned U.S. Pat. No. 3,044,879 and in U.S. Pat. No. 3,079,262 issued to Hougen, a technique including chemical reduction of the iso-alpha acids is suggested as a means of overcoming the light sensitivity. According to U.S. Pat. No. 3,079,262, after subjecting hops to a solvent extraction process forming the iso-alpha acids, the hops are contacted with hydrogen gas, a reducing agent and with a suitable catalyst in a pressurized reactor. The reaction that occurs converts iso-alpha acid to reduced iso-alpha acids.

In U.S. Pat. No. 3,044,879, a method for chemically reducing the iso-alpha acids is also described, which method may be carried out subsequent to the isomerization step or carried out during the isomerization step. According to this patent, chemical reduction is carried out by adding to the hop extract (if simultaneously isomerized) or to the isomerized extract either sodium borohydride or potassium borohydride. This reaction is carried out by first stirring the hop extract with the borohydride compound for a period of time and thereafter decomposing the borohydride by acidification and finally separating the reduced isohumulones by solvent extraction. The acidification and solvent extraction steps are required whether the reduction is carried out during isomerization or subsequent to isomerization.

Both of the techniques described in these two patents for chemically reducing the isomerized hops to improve their light stability are expensive processes requiring expensive equipment and treatment steps particularly associated with solvent extraction. The present invention is directed to improving light stability by chemically reducing the iso-alpha acids by a technique which does not require any solvent extractions, is efficient in high conversions, and is economical in terms of costs for apparatus and processing costs.

The present invention overcomes many of the shortcomings of the previously known methods for stabilizing hops and obtaining high yields of useful hops products. Some of the advantages of this invention include: compatibility with previously known procedures for processing hops prior to and during brewing; stabilization of alpha acids in hops to prevent or sharply reduce deterioration thus resulting in greater economy in storage and packaging, as well as longer shelf life; reduction in the light sensitivity or "light-struck" characteristics of hops, particularly in final hops products; methods of efficiently converting iso-alpha acids to chemically reduced iso-alpha acids; and the avoidance of large amounts of organic solvents and of solvent extraction steps as well as other complicated processing steps which are expensive and result in a loss of alpha acids.

In addition to stabilizing the alpha acid content of hops against deterioration, according to this invention, a method has been discovered which enables hops to be isomerized at faster reaction rates, under mild reaction conditions, with fewer losses of alpha acids to side reactions, yielding higher conversions of isomerized alpha acids and which efficiently produces chemically reduced isomerized products.

DESCRIPTION OF THE INVENTION

In accordance with the present invention, there is provided a method for processing hops under conditions which stabilize the humulone or alpha acid content against deterioration and light sensitivity and enables these constituents to be more efficiently utilized. The method of the present invention comprises the steps of:

(i) treating hops or hop extracts so that a substantial portion of the alpha acid content is converted to the corresponding isomerized alpha acid; and (ii) contacting the hop extracts containing isomerized alpha acids with a metallic hydride compound suitable for use in foods under suitable conditions to stabilize said isomerized alpha acids.

In addition to stabilizing the hops and alpha acids against deterioration and sensitivity to light, the above process may be used to convert the alpha acids to iso-alpha acids and to reduced isomerized products.

Any of the methods for isomerizing alpha acids, such as described in the aforementioned patents, are suitable in accordance with the present invention. In a preferred method of isomerizing the alpha acid constituents of hops, it has been found advantageous to mix the hops or hop extracts with one or more metallic oxides wherein the metal is divalent and suitable for use in food products and wherein the mixing intimately contacts the oxide material with the alpha acids in the hops. Examples of suitable metallic oxides include calcium oxide, magnesium oxide or a mixture of calcium oxide and magnesium oxide.

Although ambient temperatures are adequate, it is also preferred to use elevated temperatures in carrying out the preferred isomerization process, in order to shorten stabilization reaction times and to facilitate stabilization. For example, it has been found that the rection reaches sufficient conclusion after about 25-30 minutes where the blend of hops and metallic oxides are heated to a temperature in the range from about 70° to about 90° C. and the heat source is removed as soon as the hops reach that temperature.

Other temperatures can be employed with reaction times being varied accordingly. It is within the skill of those in the art to optimize or vary these conditions in accordance with known reaction kinetics principles.

Unlike prior art techniques which involve the solubilization of hops in organic solvents, this method of isomerization avoids the need for carrying out isomerization of the alpha acids or humulones in solution in an organic solvent. This method also does not require the use of harsh alkali treatments of the alpha acids in aqueous media, as are employed in some prior art methods. Instead, in accordance with this method, a blend is formed of the hops and oxide additives, e.g., magnesium oxide or calcium oxide, and isomerization occurs in situ under mild conditions such as room temperature, or more preferably, slightly elevated temperatures. This is a particularly preferred method of isomerization because the reduction step, more fully described below, also does not require solvent extractions and treatment with harsh chemicals or with chemicals which must be later separated from the hops for later processing.

It has been surprisingly found that with the use of the oxide materials in the isomerizing process, the moisture or water naturally present in hops, typically from about 6 to about 15% by weight, is sufficient to cause a transformation in most of the alpha acids present to their isomerized form, i.e., iso-alpha acids. If desired, it has been found that the rate of this reaction can be increased by the addition of a small amount of a lower alkanol of from about 1 to about 6 carbon atoms, e.g., methanol, ethanol, propanol, or the like, or a mixture of any of these. The alkanol can be added to the blend before or during mixing. Amounts of from about 5 to about 15% by weight of alkanol, based on the weight of the hops, are preferred.

It is to be noted that only relatively small amounts of alkanol are contemplated which are far short of the amounts required to solubilize the hops and metal oxides employed. Moreover, the alkanol need not be extracted or otherwise separated from the final stabilized product and, in most cases, substantially all of the alkanol will evaporate during processing.

Without wishing to be bound by any theory, it is believed that a protective metal salt or salts of the alpha acids or humulones is formed due to the presence of the divalent metallic oxide. These protective salts are more resistant to deterioration than the alpha acids from which they are derived. Also formed in situ is the isomerized product of the alpha acid salt.

The isomerization of the protective salts of the alpha acids yields surprising and unusual results. It has been found, for instance, that when the alpha acid salts are isomerized, the conversion reaction is highly selective in that very little by-products formation from side reactions, such as the formation of humulinic acids, occurs. Moreover, in carrying out the isomerization under the mild process conditions of this invention, very little interaction between the alpha acids and other hops constituents, e.g., beta acids or humulones, takes place. This is in contrast to prior art methods which require relatively harsh process conditions.

The results obtained with this isomerization process show that an 80% or more conversion of the starting alpha acids to the isomerized products occurs. An important aspect is that only a relatively small amount of the alpha acids will be lost or remain unrecoverable. It is also noted that of those amounts of alpha acid which are not isomerized during the present process, a substantial amount will ultimately be converted in the brewing kettle. Thus, this process enables a very high degree of efficiency in the use of the alpha acids originally contained in the starting material.

The step for stabilizing the hops from sensitivity to light is generally carried out subsequent to the isomerization of the hops. A compound selected from divalent metallic hydrides is intimately mixed with the isomerized hops at ambient temperature or at an elevated temperature in the range 40°–100° C. for a period of 3 to 30 minutes. Where the metallic hydride compound will not interfere with the isomerization reaction, it may be added to the hops prior to or during the isomerization step. There is no requirement or need to extract the hydride compound or any reaction by-product thereof from the treated hops. Therefore, a major advantage of using the hydride as the reducing agent is that extraction or separating steps are not required.

In general, metallic hydride reducing agents contain metals which are suitable for use in food products and which are active enough under mild reaction conditions to reduce the iso-alpha acids are useful in the process of the present invention. Among the divalent metallic hydrides which are suitable reducing agents for the iso-alpha acids include calcium hydride and magnesium hydride, which may be used alone or in mixtures. Generally, these metallic hydride compounds are relatively inexpensive and commercially available in the form of dry powders which are easily mixed with the hops. The small amount of moisture present with the hops is sufficient to enable the hydride to suitably react with the iso-alpha acids.

The hydride compound is added in a stochiometric amount sufficient to react with the isomerized alpha acids present. A preferred range would be about 0.3 to about 3% metallic hydride by weight of the hops powder. Whether the hydride compound should be added in excess of the molar amount of iso-alpha acids present will depend upon the reaction conditions and the economics of the process balancing the cost of chemical treatment versus the improved light stability desired for the particular end product.

BRIEF DESCRIPTION OF THE DRAWING

The drawing is a schematic diagram of a preferred embodiment according to the method of this invention.

DETAILED DESCRIPTION OF THE PREFERRED EMBODIMENT

The present invention is especially suitable for use in the pelletizing of hops in preparation for brewing and it can be integrated readily into pelletizing operations, using conventional equipment.

By way of illustration, with reference to the accompanying drawing, hops powder containing alpha acids and beta acids are obtained from hops. The hops may be processed by any number of known techniques to form a hops powder containing the alpha acids either in a concentrated form or in combination with the other constituents of the hops. For example, hops powder may typically contain about 9% by weight of alpha acids when formed from a standard hammermill or grinding step. When a concentration technique is carried out, such as is described in the above-mentioned Naatz or Hokanson et al patents, the hope powder can contain as much as 21% by weight or more of alpha acids. In either case, the hops powder also typically contains from about 6 to about 15% by weight of water.

A typical oxide additive for use in this process is a mixture of equal proportions of calcium oxide and magnesium oxide in a total amount of 0.5–3% by weight of the hops powder. Smaller amounts of the oxide additive are required where these materials are more finely ground. It is introduced into blender 4 and the contents of the blender are thoroughly and intimately mixed until a uniform, consistent blend is obtained. If desired, a small amount, e.g., 5–15% by weight, of a lower alkanol, e.g., methanol, ethanol, propanol, or the like, can also be placed into the blender and mixed with the hops powder and metallic oxides. After blending, the mixture is allowed to stabilize for a sufficient time for the isomerization reaction to be initiated. The mixture may be optionally heated to a temperature of about 75° C. which will tend to reduce the time necessary for the reaction to occur.

Calcium hydride in an amount of 0.5–1.5% by weight of the hops powder is added to the mixture either in the blender 4 or in a separate reaction vessel to which the mixture is transported (not shown). The calcium hydride and mixture are blended to allow the calcium hydride to contact the alpha and isomerized alpha acids present. Heat may be added during or subsequent to the blending to increase the rate of reaction.

After this blending, the mixture is fed through conduit 6 into pellet press 8, where pressure is briefly applied and the blend is thereby compressed into tablets or pellets. During pellet formation, heat is generated to the extent that the temperature is permitted to rise to about 50° C. to 75° C. for a few seconds prior to removing the pellets from the press. The substantially completes both the isomerization and hydrogenation of the alpha acids. General pelletizing techniques recommend controlling the heat generated during pelletization. That same control to limit deterioration of hops constituents is not necessary in the process of the present invention.

If desired, carbon dioxide can be fed in a continuous stream from pressurized cylinder 10 through regulating pump 12 into press 8 so as to form a blanket of the gas above the pellet die, and a flushing stream below the pellet die, during pellet formation.

The pellets 13 are removed from pellet press 8 on continuous moving belt 14 to cooler 16. The moving belt may be insulated to allow the pellets to maintain their elevated temperature for a sufficient time to enable final stabilization to continue to completion.

Both during the reaction with the oxides and later during reaction with the hydrides such variables as temperature of the hops, rate of heat loss and maintaining time prior to the products being subjected to the next step must be considered in choosing the optimum apparatus and process conditions.

From the belt 14, the pellets are transferred to cooler 16. The cooled pellets merge from cooler 16 on conveyer belt 18 and are carried away for packaging.

In another embodiment of the present invention, it is advantageous to add the metallic oxide additive and metallic hydride additive simultaneously to the hops. It has been found that the reaction of the hops including said alpha acids with the metallic oxides is a preferential reaction compared with the reaction of the metallic hydrides with the hops. Therefore, it has been found that the metallic oxides and metallic hydrides may be added at the same time in the reaction vessel. The mixture is maintained at the appropriate reaction conditions for the desired rate of reaction and the isomerization reaction will occur first followed by the desired reduction reaction.

With reference to the accompanying drawing and in accordance with this embodiment of the invention, both the metallic oxides and metallic hydrides may be added to the hops in blender 4. The contents of the blender are thoroughly and intimately mixed until a uniform, consistent blend is obtained. At this point, if desired, a small amount of a lower alkanol, as discussed above, can also be placed into the blender and mixed with the hops powder and metallic oxides and hydrides. After blending, the mixture is fed through conduit 6 directly into the pellet press 8 where pressure is briefly applied and the blend is thereby compressed into tablets or pellets. During the pelletizing operation, the isomerization of the alpha acids in the hops powder and the reduction of the formed isomerization acids begins to occur. Upon being pelletized, the pellets may be maintained at an elevated temperature for sufficient time to enable the isomerization and reduction reactions to continue to completion.

EXAMPLE

A hops powder is formed by hammermilling.

A magnesium oxide in an amount of 0.75% by weight of hops powder is introduced into a blender and intimately mixed with the hops powder until uniform. The mixing generates some heat which tends to raise the temperature of the mixed product. After a period of 15 minutes, calcium hydride is added in an amount of 0.70% by weight of the hops powder and the mixture is again intimately mixed in the blender until a uniform blend is obained. Hops pellets were formed directly from (i) the initial hops powder without any additives; (ii) the isomerized hops powder after being mixed with the magnesium oxide; and (iii) the reduced isomerized hops powder after being treated with magnesium oxide and subsequently with calcium hydride. The content of alpha acids, iso-alpha acids and reduced iso-alpha acids was measured in each of the pellets formed. The results of those measurements are set forth in the table below:

| Constituent | Control Pellets (no additives) | Iso Pellet (+0.75% MgO) | Reduced Iso Pellet (+0.75% MgO +0.70% CaH2) |
|---|---|---|---|
| Alpha Acids | 6.8 | 0.6 | 0.4 |
| Iso-Alpha Acids | 0 | 6.7 | 0.7 |
| Reduced Iso-Alpha Acids | 0 | 0 | 5.8 |

By means of this preferred process, in the order of 80% or more by weight of the alpha acids present in the hops powder prior to treatment are converted to the desired iso-alpha acids, with no appreciable losses of alpha acids or iso-alpha acids during processing. In the order of 85% of the iso-alpha acids formed are converted to the reduced iso-alpha acid derivative.

The method of this invention can also be carried out using other techniques of processing hops for brewing. For example, after forming an intimate blend of hops powder and magnesium and/or calcuium oxides, optionally including minor amounts of an alcohol, e.g., methanol, the blend can be moderately heated, e.g., to a temperature of from about 40° to about 100° C., maintained at that temperature for a brief period, e.g., from about 5 to 60 minutes while isomerization takes place, and then cooled to room temperature. A similar optional heating step may be carried out after the hydride treatment step Other modifications and variations of this invention will occur to those skilled in the art in the light of the above description. It is to be understood, therefore, that changes may be made in the particular embodiments described herein which are within the full intended scope of the invention as defined in the appended claims.

What is claimed is:

1. A method for processing hops in a manner which tends to stabilize the hops including the humulone of alpha acid constituents thereof against deterioration and light sensitivity, said method comprising the steps of:
   (i) treating hops powder or hops power concentrate so that a substantial portion of the alpha acid content thereof is converted to isomerized alpha acid;
   (ii) contacting said hops powder or hops powder concentrate containing isomerized alpha acids with metallic hydride compound under suitable conditions to chemically reduce a substantial portion of said isomerized alpha acids, wherein the metal of said metallic hydride is monovalent or divalent and is suitable for use in foods; and
   (iii) maintaining said mixture of hops powder or hops powder concentrate and metallic hydride under suitable reaction conditions to obtain increased stability in said hops and alpha acids and end product thereof, from deterioration and light sensitivity.

2. The method of claim 1 wherein said hops powder concentrate are in the form of a hops powder formed by grinding hops.

3. The method of claim 1 wherein said hops powder or hops powder concentrate are in the form of a concentrated hops powder.

4. A method of claim 1 wherein the temperature of the mixture of hops powder or hops powder concentrate and metallic hydride is increased during a portion of the contacting and maintaining steps.

5. The method of claim 4 wherein said temperature is increased in the range of from about 40° to about 100° C.

6. The method of claim 1 wherein said metallic hydride is selected from calcium hydride, magnesium hydride or a mixture thereof.

7. The method of claim 6 wherein said method is carried out without employing a solvent extraction step.

8. The method of claim 1 wherein step (iii) is carried out simultaneously with a pelletization step.

9. The method of claim 1 wherein said metallic hydride is present in a stoichiometric amount to react with the isomerized alpha acid present in the hops powder or hops powder concentrate.

10. The method of claim 1 wherein said metallic hydride is present in an amount from about 0.3–3% by weight of the hops powder.

11. A method for forming chemically reduced, isomerized alpha acids in hops powder or hops powder concentrate, said method comprising the steps of:
(i) mixing the hops powder or hops powder concentrate containing alpha acids with one or more metallic oxides wherein the metal is divalent and suitable for use in food products, so as to intimately contact the oxide material with the alpha acids under conditions insufficient to form a solution;
(ii) maintaining said mixture of hops powder or hops powder concentrate and oxide material under suitable reaction conditions to convert a substantial portion of the alpha acids to isomerized alpha acids;
(iii) contacting the hops powder or hops powder concentrate containing isomerized alpha acids with a metallic hydride compound capable of chemically reducing a substantial portion of said isomerized alpha acids, wherein the metal of said metallic hydride is monovalent or divalent and is suitable for use in foods; and
(iv) holding said mixture of hops powder or hops powder concentrate and metallic hydride under suitable reaction conditions to obtain increased stability in said hops and alpha acids and end product thereof from deterioration and light sensitivity.

12. The method of claim 11 wherein said hops powder or hops powder concentrate are in the form of a hops powder formed by grinding hops.

13. The method of claim 11 wherein said hops powder or hops powder concentrate are in the form of a concentrated hops powder.

14. The method of claim 11 wherein in step (ii) the temperature of the mixture of hops powder or hops powdered concentrate and oxide material is increased to the range of from about 40° to about 100° C.

15. The method of claim 10 wherein said metallic oxide is selected from calcium oxide, magnesium oxide or a mixture thereof.

16. The method of claim 11 wherein said metallic oxide is present in an amount from about 0.5 to about 3% by weight of said hops powder.

17. The method of claim 11 wherein a small amount of a lower alkanol, insufficient to form a solution of the hops powder or hops powder concentrate or alpha acids thereof, is also admixed in step (i).

18. The method of claim 17 wherein said lower alkanol is selected from methanol, ethanol, propanol or a mixture thereof.

19. The method of claim 11 wherein the temperature of the mixture of hops powder or hops powder concentrate and metallic hydride is increased during a portion of the (iii) contacting and (iv) holding steps.

20. The method of claim 19 wherein said temperature is increased in the range of from about 40° to about 100° C.

21. The method of claim 11 wherein said metallic hydride is selected from calcium hydride, magnesium hydride or a mixture thereof.

22. The method of claim 21 wherein said method is carried out without employing a solvent extraction step.

23. The method of claim 11 wherein step (iv) is carried out simultaneously with a step for pelletizing the hops.

24. The method of claim 11 wherein said metallic hydride is present in a stoichiometric amount to react with the isomerized alpha acid present in the hops powder or hops powder concentrate.

25. The method of claim 11 wherein said metallic hydride is present in an amount from 0.3–3% by weight of the hops powder.

26. A method for forming chemically reduced, isomerized alpha acids in hops powder or hops powder concentrate, without employing a solvent extraction step, said method comprising
(i) mixing a hops powder containing said alpha acids with a metallic oxide selected from the group consisting of calcium oxide, magnesium oxide, or a mixture thereof so as to intimately contact the oxide material with the alpha acids, said metallic oxide being present in the amount of from about 0.5 to about 3% by weight of the hops powder; and
(ii) maintaining said mixture under suitable reaction conditions to enable isomerization of said alpha acids to occur; and
(iii) contacting the hops powder or hops powder concentrate containing isomerized alpha acids with a metallic hydride compound under suitable conditions to chemically reduce said isomerized alpha acids, wherein said metallic hydride is selected from calcium hydride, magnesium hydride or a mixture thereof, said metallic hydride present in a total amount from about 0.3 to about 3% by weight of the hops powder; and
(iv) holding said mixture of hops powder or hops powder concentrate and metallic hydride under suitable reaction conditions to enable a substantial portion of said iso-alpha acids to be chemically reduced.

27. The method of claim 26 wherein said hops powder or hops powder concentrate are in the form of a concentrated hops powder.

28. A method for forming pelletized hops containing reduced isomerized alpha acids without employing a solvent extraction step, said method comprising the steps of:
(i) mixing the hops powder or hops powder concentrate containing alpha acids with one or more metallic oxides wherein the metal is divalent and suitable for use in food products, so as to intimately contact the oxide material with the alpha acids under conditions insufficient to form a solution;
(ii) maintaining said mixture of hops powder or hops power concentrate and oxide material under suitable reaction conditions to convert a substantial portion of the alpha acids to isomerized alpha acids;
(iii) contacting the hops powder or hops powder concentrate containing isomerized alpha acids wih a metallic hydride compound under suitable conditions to chemically reduce said isomerized alpha acids, wherein the metal of said metallic hydride is monovalent or divalent and is suitable for use in foods;

(iv) shaping the contact hops powder or hops powder concentrate briefly under pressure into the form of pellets wherein sufficient heat is generated to accelerate the reduction reaction of the isomerized alpha acids in said hops power or hops powder concentrate; and (v) removing said pellets from under pressure and allowing the reaction to proceed to completion.

29. The method of claim 28 wherein said hops powder or hops powder concentrate are in the form of a concentrated hops powder.

30. The method of claim 28 wherein said metallic oxide is selected from calcium oxide, magnesium oxide or a mixture thereof and is present in an amount from about 0.5 to about 3% by weight of said hops powder.

31. The method of claim 28 wherein the temperature of the mixture of hops and metallic oxide is increased during a portion of the (i) mixing and (ii) maintaining steps.

32. The method of claim 28 wherein said metallic hydride is selected from calcium hydride, magnesium hydride or a mixture thereof and is present in an amount from 0.3–3% by weight of the hops powder.

33. A method for forming pelletized hops containing reduced isomerized alpha acids, said method comprising the steps of:

(i) mixing the hops powder or hops powder concentrate containing said alpha acids with one or more metallic oxides wherein the metal is divalent and suitable for use in food products, so as to intimately contact the oxide material with the alpha acids under conditions insufficient to form a solution;

(ii) maintaining said mixture of hops powder or hops powder concentrate and oxide material under suitable reaction conditions to enable isomerization of said alpha acids to occur;

(iii) contacting the hops powder containing isomerized alpha acids with a metallic hydride selected from the group consisting of calcium hydride, magnesium hydride, or a mixture thereof, so as to intimately contact the hydride material with the alpha acids, said metallic hydride being present in a sufficiently stoichiometric amount to react with acid isomerized alpha acids;

(iv) shaping the mixture of hops powder and hydride material briefly under pressure into the form of pellets wherein sufficient heat is generated to accelerate the reduction reaction of the isomerized alpha acids in said hops powder; and (v) removing said pellets from under pressure and allowing the reduction reaction to proceed to completion.

34. The method of claim 33 wherein said method is carried out without employing a solvent extraction step.

35. The method of claim 33 wherein said oxide material is present in an amount from about 0.5% to about 3% by weight of the hops powder.

36. The method of claim 33 wherein said hydride is present in an amount from 0.3% to about 3% by weight of the hops powder.

37. The method of claim 33 wherein said metallic oxide is selected from the group consisting of calcium oxide, magnesium oxide or mixtures thereof.

38. The method of claim 33 wherein said hops powder or hops powder concentrate are in the form of a concentrated hops powder.

39. The method of claim 33 wherein a small amount of a lower alkanol, insufficient to form a solution of the hops powder or hops powder concentrate is also admixed in step (i).

40. A method for forming chemically reduced, isomerized alpha acids in hops powder or hops powder concentrate, said method comprising the steps of:

(i) contacting the hops powder or hops powder concentrate containing alpha acids with (a) one or more metallic oxides wherein the metal is divalent and suitable for use in food products, and (b) a metallic hydride compound capable of chemically reducing isomerized alpha acids which are formed, wherein the metal of said metallic hydride is monovalent or divalent and is suitable for use in foods;

(ii) mixing the materials formed in step (i) so as to intimately contact the oxide and hydride materials with the alpha acids under conditions insufficient to form a solution; and (iii) maintaining said mixture of hops powder or hops powder concentrate and oxide material under suitable reaction conditions to enable said hops and alpha acids to become stabilized.

41. The method of claim 40 wherein said hops powder or hops powder concentrate are in the form of a concentrated hops powder.

42. The method of claim 40 wherein the temperature of the mixture of hops powder or hops powder concentrate and oxide and hydride materials is increased to the range of from about 40° to about 100° C.

43. The method of claim 40 wherein step (iii) is carried out simultaneously with a step for pelletizing the hops.

* * * * *

UNITED STATES PATENT AND TRADEMARK OFFICE
CERTIFICATE OF CORRECTION

PATENT NO. : 4,154,865
DATED : May 15, 1979
INVENTOR(S) : Herbert L. Grant

It is certified that error appears in the above-identified patent and that said Letters Patent are hereby corrected as shown below:

```
   In the Abstract, line 6, "witha" should read --with a--.
   Column 2, line 5, "Kokanson" should read --Hokanson--.
   Column 4, line 22, "rection" should read --reaction--.
   Column 5, line 12, "by-products" should read
-- by-product--.
   Column 6, line 23, "hope" should read --hops--; line 58,
"The" should read --This--.
   Column 8, line 21, "calcuium" should read --calcium--;
line 40, "of" should read --or--; line 43, "power" should
read --powder--; line 47, after the word "with", insert the
word --a--; line 59, after the word "powder", insert the words
--or hops powder--.
   Column 9, line 52, "powdered" should read --powder--;
line 54, "claim 10" should read --claim 11--.
   Column 11, line 6, "contact" should read --contacted--;
line 10, "power" should read --powder--.
```

Signed and Sealed this

Twenty-third Day of October 1979

[SEAL]

Attest:

RUTH C. MASON
Attesting Officer

LUTRELLE F. PARKER
Acting Commissioner of Patents and Trademarks